United States Patent

Skala

[15] 3,678,488

[45] July 18, 1972

[54] SELF-ADJUSTING CONDENSATION NUCLEI MONITOR MEASURING CIRCUIT HAVING ADJUSTABLE GAIN

[72] Inventor: George F. Skala, Schenectady, N.Y.

[73] Assignee: Environment/One Corporation, Schenectady, N.Y.

[22] Filed: Feb. 8, 1971

[21] Appl. No.: 113,561

[52] U.S. Cl. ....................................340/236, 356/37

[51] Int. Cl. ....................................G08b 19/00

[58] Field of Search ....................340/236; 356/37, 207, 208

[56] References Cited

UNITED STATES PATENTS 3,618,061 11/1971 Livers....................................340/236

*Primary Examiner*—Donald L. Yusko

*Attorney*—Charles W. Helzer

[57] ABSTRACT

A detecting and amplifying circuit for a multi-zone fire and/or detection system comprising a common sensor-detector located at a control station for detecting and signaling the existence of an alarm condition in any one of the zones being monitored. The common sensor-detector preferably comprises a condensation nuclei monitor and is selectively switched from one zone to the next to monitor conditions in each respective zone sequentially. The rate at which the zones are monitored is relatively rapid on the order of once every 10 minutes or slow depending upon the number of zones, etc. An output feedback amplifier is coupled to the output from the common condensation nuclei sensor-detector for amplifying the output signals derived from the detector. A plurality of gain change resistors are selectively connectable in the feedback path of the output feedback amplifier to adjust its gain selectively to a number of different values. Cam operated switches which are operated synchronously with the selective switching of the common condensation nuclei sensor detector from one zone to the next operate to connect in preselected ones of the resistors into effective circuit relationship in the feedback path of the output feedback amplifier. Consequently, the sensitivity of the overall detecting and amplifying circuit is individually adjusted to background conditions existing in each of the zones being monitored synchronously with the switching of the common condensation nuclei monitor sensor-detector from one zone to the next. The condensation nuclei monitor is of the self-adjusting type including a first photo cell detector for detecting short term changes in light level of a light beam impinging on the photo cell as opposed to longer term changes in operating characteristics of the photo cell due to temperature effects, dust accumulation in the optical path, aging and the like. Self-adjustment is provided by a second lamp-photo cell module having the photo cell connected in circuit relationship with the first nuclei particle sensing photo cell for maintaining substantially constant long term electric energization conditions across the first photo cell. A first output feedback amplifier is provided with the first photo cell connected in its feedback path and is responsive to both fast and long time constant changes in operating conditions of the first photo cell. The lamp of the lamp-photo cell module is connected in a second long time constant feedback path of the first feedback amplifier for controlling the intensity of the light impinging on the second photo cell whereby substantially constant long term electric energization conditions are maintained across the first nuclei particle sensing photo cell. By reason of the inclusion of the feedback lamp-photo cell module in the long time constant feedback path, isolation between the output of the feedback amplifier and the input to the nuclei particle sensing photo cell, is provided.

20 Claims, 2 Drawing Figures

United States Patent
Skala
[15] 3,678,488
[45] July 18, 1972
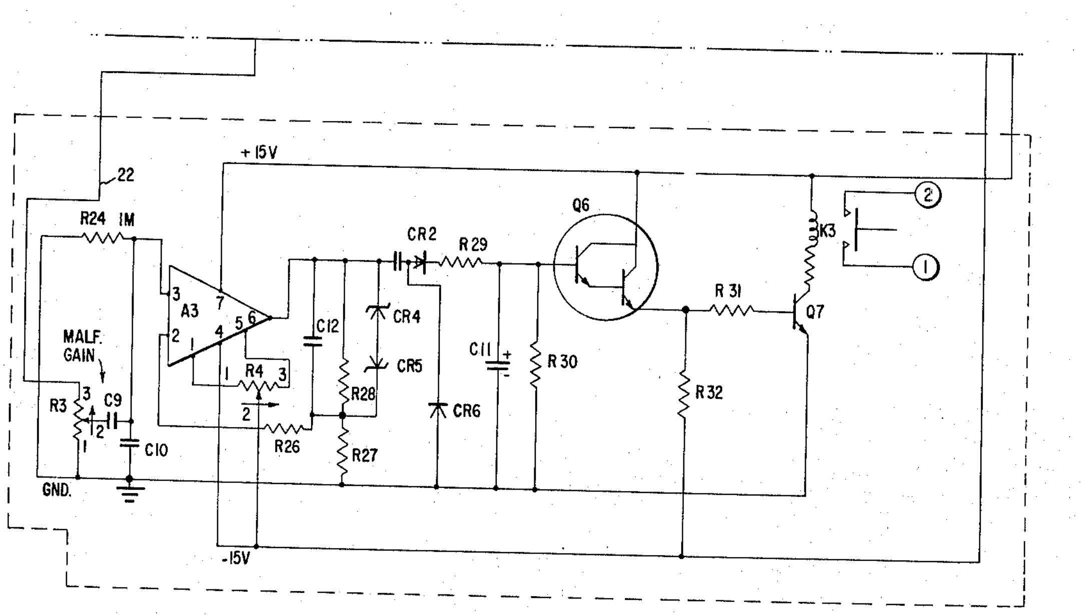

INVENTOR

GEORGE F. SKALA

BY *Charles W. Helzer*

ATTORNEY

PATENTED JUL 18 1972

3,678,488

INVENTOR
GEORGE F. SKALA

BY Charles W. Helzer

ATTORNEY

SELF-ADJUSTING CONDENSATION NUCLEI MONITOR MEASURING CIRCUIT HAVING ADJUSTABLE GAIN

BACKGROUND OF INVENTION

FIELD OF INVENTION

This invention relates to a new and improved self-adjusting condensation nuclei monitor measuring circuit having an adjustable gain feature for automatically conditioning the circuit for use under widely varying background conditions within relatively short time periods.

More specifically, the invention relates to such a circuit for use with a single, common fire and/or dangerous gas sensor-detector which sequentially is switched to sample and monitor the atmospheres of a number of different zones having widely different background characteristics of a multi-zone area, building or facility being protected by an automatically operating fire and/or dangerous gas detection system. The single, common fire and/or gas sensor-detector preferable comprises a condensation nuclei monitor having improved self-adjusting features providing isolation between the output and the input for maintaining sensitivity of the monitor despite dust accumulation, aging, temperature or other similar affects which might adversely affect satisfactory operation of the monitor.

BACKGROUND PROBLEM

In co-pending U.S. Pat. application Ser. No. 113,284 filed Feb. 8, 1972 HO 5107 entitled "Multi-zone Incipient Or Actual Fire And/Or Dangerous Gas Detection System"-F. A. Ludewig, Jr. and F.W. Van Luik, Jr. Inventors, filed concurrently with this application, a multi-zone incipient or actual fire and/or dangerous gas detection system is described. In that system, a number of different zones having widely different background characteristics are grouped together and protected by a single, common condensation nuclei monitor detector-sensor. In this system, the various different zones being protected are sampled sequentially by a suitable sampling system and selective valve assembly that operates sequentially to connect the input of the common condensation nuclei monitor to each of the different zones being monitored. The multi-zone areas being protected may constitute the different floors of a multi-story building, a manufacturing facility, a school building, or other similar multi-zone facility. The condensation nuclei monitor is a known, highly sensitive instrument for detecting the presence of condensation nuclei particles in an atmosphere, and by appropriate modification which can be readily accomplished can be adapted to sense the presence of certain dangerous, combustible gases. By appropriate design and adjustment, the condensation nuclei monitor can be conditioned to response to widely different nuclei particle concentrations. In a building such as a school building, the normal background particle concentration in a classroom would be widely different from the background particle concentration present in the furnace room or kitchen of the cafeteria. Because of these widely different background conditions in a multi-zone area being protected, it is essential to adjust the sensitivity of the common, condensation nuclei monitor detector-sensor so as to individually tailor the instrument for each of the respective zones being monitored. For this purpose, the present invention was devised.

In addition to the above described problem, it is known that instruments such as the condensation nuclei monitor which employ a light source and photo-detector arrangement to sense condensation nuclei particles in a sample atmosphere, will lose sensitivity over prolonged periods of operation due to aging of the components, temperature effects, dust accumulation in the optical path, and other similar effects which tend to adversely affect operation of the instrument. To overcome these factors an additional sensitivity adjusting feature is provided for automatically maintaining the sensitivity of the light source-photo detector arrangement while at the same time isolating the input to the monitor from its output.

SUMMARY OF INVENTION

It is therefor a primary object of the invention to provide a new and improved self-adjusting condensation nuclei montior measuring circuit having an adjustable gain feature for automatically conditioning the circuit for use under widely varying background conditions within relatively short time periods and over prolonged operating intervals.

A further object of the invention is to provide such an improved circuit for use with a single, common fire and/or dangerous gas sensor-detector which sequentially is switched to sample and monitor the atmosphere of a number of different zones having widely different background characteristics of a multi-zone area, building or facility being protected, and which has improved, self-adjusting features for maintaining sensitivity despite dust accumulation, aging, temperature or other similar affects which might adversely affect satisfactory operation of the monitor.

In practicing the invention a detecting and amplifying circuit for a multi-zone monitoring system is provided and comprises a common sensor detector located at a common control station for detecting and signaling the existence of an alarm condition in any one of the zones being monitored. The common sensor detector preferably is a condensation nuclei monitor and is selectively switched from one zone to the next to monitor conditions in each respective zone sequentially. An output feedback amplifier is coupled to the output of the common condensation nuclei monitor for amplifying the output signals derived from the monitor. A plurality of gain change resistors are selectively connectable in the feedback path of the output feedback amplifier to adjust its gain to a number of different values in accordance with which resistor selectively is connected in the feedback path. Selectively operable switches are provided which operate synchronously with the selective switching of the common condensation nuclei monitor from one zone to the next for switching pre-selected ones of the resistors into effective circuit relationship in the feedback path of the output feedback amplifier. As a consequence, the sensitivity of the overall detecting and amplifying circuit individually is adjusted to background conditions existing in each of the respective zones being monitored synchronously with the switching of the common condensation nuclei monitor from one zone to the next.

In addition to the above features, an improved self-adjusting electro-optical detecting circuit is provided which includes a first electro-optical detecting means for sensing short term changes in the light level of a light beam. These short term changes in light level may be induced by the presence of humidified and expanded condensation nuclei particle cloud formations representative of the particle concentration present in the atmospheres of the different zones being monitored. The short term changes are to be distinguished from long term changes in operating characteristics due to temperature effects, dust accumulations in the light-optical path aging and the like. To overcome these latter longer term effects, a second electro-optic detector is connected in series circuit relationship with the first electro-optic detector and is illuminated from a second lamp that is connected in a feedback path of an output feedback amplifier having the first electro-optic detector connected in a first fast time constant feedback path. The second lamp is connected in a long time constant feedback path of the feedback amplifier and is responsive only to long term changes. The feedback amplifier is connected as an inverting amplifier so that the second lamp operates through the second detector to maintain substantially constant long term electric energization conditions across the first electro-optic detector that senses the condensation nuclei particles. With this arrangement the second lamp - second electro-optic detector arrangement provides isolation between the output of the feedback amplifier and the input so as to effectively decouple the output from the input for all save the long term changes desired to be overcome.

These and other objects, features and many of the attendant advantages of the invention will be appreciated more readily as the same becomes better understood by reference to the following detailed description, when considered in connection with the accompanying drawings, wherein:

FIG. 1 is a detailed circuit diagram of the new and improved self-adjusting condensation nuclei monitor detecting and amplifying circuit constructed in accordance with the invention; and FIG. 2 is a detailed circuit diagram of a malfunction circuit branch that is connected to the circuit arrangement shown in FIG. 1 and comprises a part of the overall detecting and amplifying circuit.

DETAILED DESCRIPTION OF PREFERRED EMBODIMENTS

Figure 1:
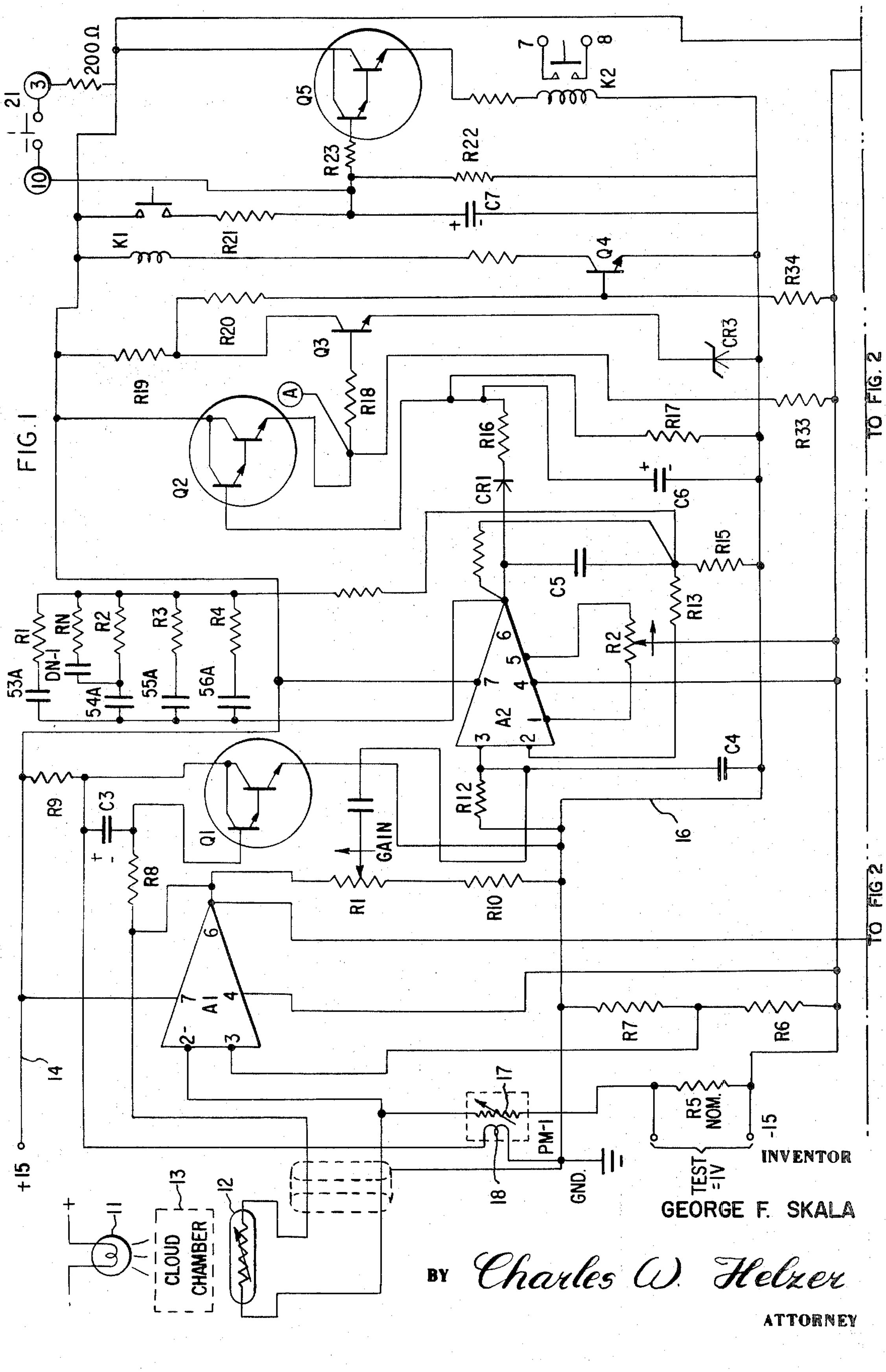
Figure 2:
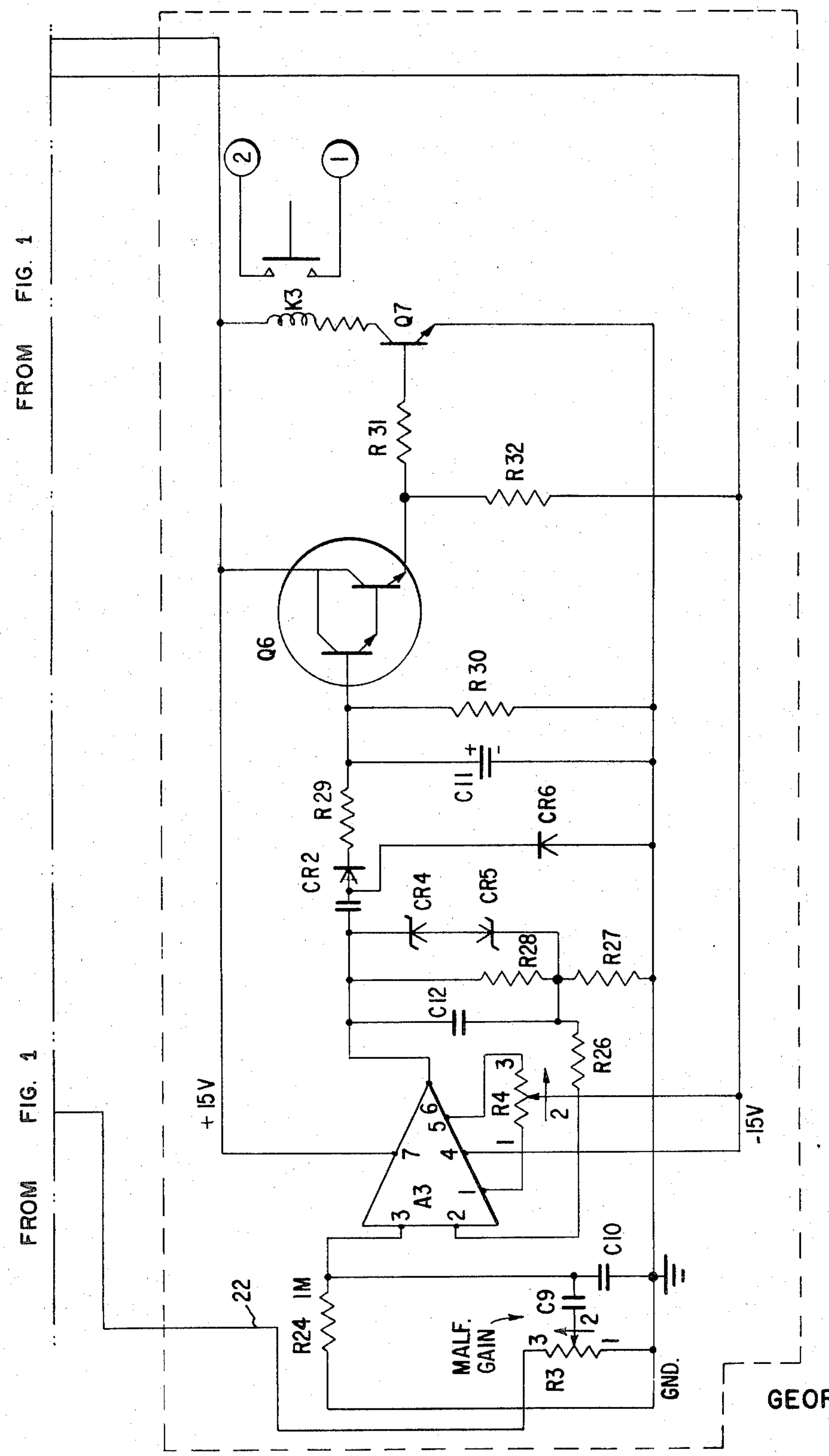

FIGS. 1 and 2 considered together comprise a detailed circuit diagram of a new and improved condensation nuclei monitor measuring circuit constructed in accordance with the invention. In FIG. 1, a lamp 11 and a photo cell 12 are disposed at opposite ends of a cloud chamber, indicated schematically at 13. The lamp 11 and photo cell 12 comprise the electro-optic detecting means of a condensation nuclei monitor (not shown), and are arranged so that a light beam from lamp 11 normally is allowed to impinge upon the photo sensitive surface of the photo cell 12. Upon the production of a cloud of water droplets in the cloud chamber 13, light will be scattered away from the photo cell 12 so as to produce an increase in the electrical resistance of the photo cell 12. This increase in electrical resistivity is in proportion to the size of the cloud of the water droplets which in turn is proportional to the number or concentration of condensation nuclei particles entrained in the atmosphere being sampled by the condensation nuclei monitor. Alternatively, a dark field electro-optic arrangement could be employed wherein the cloud of water droplets due to scattering causes light from lamp 11 which is normally blocked from impinging on photo cell 12, to be scattered onto the photo cell thereby causing a decrease in the resistance of the cell. For a detailed description of the construction and operation of known condensation nuclei monitor that function in this manner, reference is made to copending United States patent application Ser. number 840,775, filed July 10, 1969 — entitled "Self-Adjusting Short Pulse Detecting And Amplifying Circuit" — T.A. Rich, inventor and to U.S. Pat. No. 2,694,008 issued July 20, 1964 for "Method And Apparatus For Measuring The Concentration Of Condensation Nuclei". Additionally, while the device 12 is described as a photo cell, the invention described herein is not limited to use with photo cells but may be employed in conjunction with any electro-optical detector such as a photo conductor, photo voltaic device, a photo diode, a photo transistor or other similar light or heat sensitive device for converting radiant energy to electric energy.

The photo cell 12 is directly connected in the feedback path of an inverting feedback amplifier A1 which may comprise any known form of feedback amplifier. Preferably, however, the amplifier A1 comprises an integrated circuit operational amplifier such as the Fairchild 7741 manufactured and sold by the Fairchild Camera Company or some other similar, commercially available, integrated feedback amplifier circuit. The inverting feedback amplifier A–1 is connected to and supplied from a +15 volt direct current power supply terminal 14 and a −15 volt power supply terminal 15 and to a pair of biasing resistors R6 and R7 connected between the −15 volt terminal 15 and a ground power supply terminal 16. The photo cell 12 is directly connected between the number 6 output terminal and the number 2 input terminal of inverting feedback amplifier A1. With this arrangement, if the amplifier input current is maintained at a constant value, the voltage appearing at the output terminal of amplifier A1 will be directly proportional to changes in the resistance of the photo cell 12.

In order to maintain the input current to amplifier A1 at a substantially constant value, a second photo cell 17 is provided along with a second lamp 18. The lamp 18 and second photo cell 17 comprise an integrally packaged, single housing lamp-photo cell module designated PM–1 of the type manufactured and sold by a number of electronic component suppliers. This lamp-photo cell module includes both the lamp 18 and second photo cell 17 in a single, sealed enclosure so as to prevent any dust accumulation in the optical path between the two elements, etc which otherwise might adversely affect the response of the second photo cell 171. Lamp 18 is connected between ground terminal 16 and the output of the inverting feedback amplifier A1 through the medium of a long time constant feedback coupling circuit comprised by a capacitor C3 and resistor 8 whose junction is connected to the input base of a pair of darlington connected NPN transistors Q1. Transistor pair Q1 in turn is connected in series with a bias resistor R9 across the +15 volt power supply terminal 14 and ground 16. With this arrangement, the conductivity of transistor pair Q1 will vary only in response to long time constant changes in the output of amplifier A1 to thereby vary the voltage applied to lamp 18. This in turn results in varying the intensity of the light directed upon the second photo cell 17 inversely in accordance with the long term changes in the output of amplifier of A1. Because of its long time constant this circuit does not respond to short term transient changes in the voltage appearing at the output of amplifier A1 such as would be caused by the cloud of water droplets in the expansion chamber.

The second photo cell 17 is connected in series circuit relationship with a sensing resistor R5 between the number 2 input terminal of inverting feedback amplifier A1 and the −15 volt power supply terminal 15. As a consequence of the above described long time constant feedback arrangement through lamp 18 and the inverting nature of feedback amplifier A1, the resistivity of photo cell 17 will be varied in a direction to maintain the long term voltage across the cloud chamber photo cell 12 constant and hence to maintain substantially constant input current to the number 2 input terminal of amplifier A1. Thus, should the characteristics of lamp 11 change due to aging, temperature effects, or the like, or the reflectance from the walls of the cloud chamber 13 changes, or other effects such as dust accumulation in the optical path, tend to change the long term characteristics of the cloud chamber photo cell 12, such long term effects will be compensated for thorough operation of the long time constant feedback path through lamp 18 and second photo cell 17. The sensing resistor R5 inserted in series with the second photo cell 17 is used to monitor the operation of the circuit during servicing. As the illumination on the cloud chamber photo cell 12 deteriorates due to dirt on the walls of the chamber, etc as mentioned above, the voltage measured at the test terminals across sensing resistors R5 will decrease, and can be used as an indication of when the cloud chamber should be cleaned or otherwise serviced.

The signal output voltage appearing at the number 6 output terminal of amplifier A1 will be in the form of a series of pulsed, short time constant changes in voltage which are representative of the particle count sensed by the cloud chamber photo cell 12 and will have a reptition rate dependent upon the rate of sampling of the cloud chamber. This pulse wave form output signal appears across a pair of series connected gain changing resistors R1 and R10 and is supplied through a capacitor-resistor coupling network C2 and C4 and resistor R12 to the number 3 input terminal of a non-inverting, second feedback amplifier A2. Amplifier A2 may comprise a conventional, commercially available, integrated circuit operational amplifier such as the Fairchild 7741, and is energized from the supply terminals 14–16 through appropriate biasing resistors. In addition, the second feedback amplifier A2 includes a plurality of gain changing resistors R1, R2, R3, R4 which are selectively connectable in circuit relationship in the feedback path of amplifier A2. Selectively operable switch contacts S3A, S4A, S5A and S6A upon being closed function to connect their associated resistors R1, R2, R3 or R4 respectively, into effective circuit relationship in the feedback path of amplifier A2. The switch contacts S3A–S6A are cam actuated switches, and are automatically and sequentially closed by a timing cam synchronously with the switching of the input of the cloud chamber 13 from one zone to another of a multizone area being monitored by the system. For a more detailed description of a suitable timing cam construction usable for actuating the contacts S3A–S6A in the above described manner, reference is made to copending U.S. application Ser. No. 113,258 filed Feb. 8, 1972 Frederick A. Ludewig, Jr. inventor entitled "Fluid Sampling Valve" filed concurrently with this invention, and assigned to the Environment/One Corporation.

The effect of connecting different ones of the gain changing resistors R1–R4 into the feedback path of amplifier A2 is selectively to adjust the gain of A2 to cause it to correspond to the background conditions of a particular individual zone being sequentially sampled at that point in time by the sampling system input to condensation nuclei monitor 11–13. Accordingly, it will be appreciated that as the condensation nuclei monitor 11–13 automatically and sequentially is caused to sample different zones having different background conditions, the gain of the feedback amplifier A2 synchronously will be adjusted to correspond to the background conditions of the particular zone being sampled. As a consequence, in installations such as a school when the condensation nuclei monitor is monitoring the atmosphere of a relatively dirty room such as the furnace room having a large background condensation nuclei particle count normally present, the gain of the feedback amplifier A2 is adjusted downwardly so that this normal background signal is amplified to a lesser extent. Conversely, where the condensation nuclei monitor is monitoring a relatively clean room such as a classroom, the gain is adjusted upwardly so as to in effect compensate for the differences in normal background particle count present in the different zones being monitored.

In addition to the zone change resistors R1–R4, time of day gain changing resistors may be connectable in the feedback path of amplifier A2 such as shown at RN–1. This time of day gain change resistor is switched into effective circuit relationship in the feedback path of amplifier A2 by operation of time actuated switch contacts DN–1. With this arrangement, consider that zone 2 is an assembly room of a manufacturing facility where in the day time a large number of persons are active and produce a relatively high background count. At nighttime these persons leave and the background count goes down. By switching in resistor RN–1 with a time actuated signal, the zone 2 response of the system can be conformed to these day and night changes in background signal level.

The amplified and compensated signal appearing at the number 6 output terminal of the second output feedback amplifier A2 is supplied to a peak rectifying circuit comprised by a diode rectifier CR1 where it is peak rectified and the peak value stored on a capacitor C6. Resistor R17 serves to discharge capacitor C6 intermediate each sampling interval of the condensation nuclei monitor. The peak signal appearing on storage capacitor C6 is supplied through an emitter-follower Q2 having unity gain to the input of a level sensing and comparison circuit. The level sensing and comparison circuit is comprised by an NPN transistor Q3 having a zener diode CR3 connected in its emitter circuit. The zener diode CR3 is designed to have a breakover voltage which establishes a maximum reference voltage threshold level that must be overcome in order to render the transistor Q3 conductive.

The output from the level sensing and comparison circuit is supplied to a fail-safe alarm indicating circuit that is comprised by a transistor Q4 having its base coupled to the collector of transistor Q3 through a pair of voltage dividing resistors R20 and R34. Transistor Q4 is biased by resistors R19, R20 and R34 so as to be normally conductive and for so long as Q4 remains conducting, the solenoid winding of a relay actuated switch K1 will be energized. For as long as the relay actuated switch K1 is energized, its normally open contacts will be closed thereby providing a constant charge from the +15 volt power supply terminal 14 to a charging capacitor C7. Capacitor C7 in turn is coupled to the base electrode of a pair of darlington connected output transistors Q5, and is allowed to discharge through the parllel connected resistor R22. The output transistors Q5 are connected in series with the energizing winding of a solenoid actuated switch K2 between ground and the +15 volt terminal 14. Thus, it will be seen that so long as the switch contacts K1 are maintained closed, charging capacitor C7 will remain charged, maintaining transistors Q5 turned on thereby energizing the K2 solenoid winding and maintaining the K2 contacts closed.

In the event of an excessive particle count in any of the zones being monitored by the condensation nuclei monitor 11–13, the voltage appearing at point A will raise sufficiently to overcome the maximum reference threshold level established by the zener diode CR3. Upon this occurrence, transistor Q3 turns on and lowers the base-emitter voltage of Q4 sufficiently to cause Q4 to turn-off. As a consequence K1 is deenergized thereby allowing is contacts to open. At this point, capacitor C7 will start to discharge through resistor R22 at a relatively fast rate determined by RC time constant of C7 and R22 which is adjusted to prevent transient disturbances from turning off transistor Q5. However, during an alarm condition signalled by the peak output exceeding the threshold of zener CR3, Q5 will turn off due to the continued discharge of C7 through R22 thereby allowing K2 to drop out. The opening of the K2 contacts will then operate the alarm relay circuitry of an overall detecting system described more fully in copending U.S. Pat. application Ser. No. 113,284 filed Feb. 8, 1972 entitled "Multi-zone Incipient or Actual Fire And/Or Dangerous Gas Detection System"—Frederick A. Ludewig, Jr. and F. W. Van Luik, Jr. inventors, filed concurrently with this application, and assigned to the Environment/One Corporation. Thus, it will be appreciated that the alarm indicating circuitry normally must be energized in order to be maintained in its safe (non-alarm) condition. As a consequence, in the event of a power failure, a component failure, etc. the alarm indicating relays will be deenergized and drop out to signal an alarm condition thereby indicating at a central monitoring station that either an alarm condition exists or a failure has occurred, and that the system must be checked.

In addition to the above features, an additional cam-actuated micro-switch shown schematically at 21 is provided which operates synchronously with the switching in of the gain changing resistors R1–R4 in the feedback path of the second feedback amplifier A2. This cam actuated micro-switch 21 operates to clamp the charging capacitor to the +15 volt power supply terminal for a short time interval at the time that the input to the condensation nuclei monitor 11–13 is switched to sample a different zone than that which it previously has been monitoring. This occurs synchronously with the selective switching in of a different one of the gain changing resistors R1–R4. As a consequence of this arrangement, if the input to the condensation nuclei monitor is switched from a dirty background room being monitored such as a furnace room of a school, to a relatively clean classroom, and synchronously the gain of feedback amplifier A2 is adjusted for the background conditions of the relatively clean classroom, the inertia present in the system may cause a relatively high amplitude output signal to appear at the output of amplifier A1 due to the fact that the relatively dirty background sample atmosphere of the previously monitored dirty background zone, has as yet not been completely flushed out of the sampling system. Under these conditions, an erroneous alarm condition might be signaled if the charging capacitor C7 were not clamped to maintain its voltage thereby maintaining Q5 turned on and alarm solenoid K2 picked up. After an interval of time determined by design of the cam actuating switch 21, and gauged to the time required to normally flush out the sample system, switch 21 again opens. If at this point the magnitude of the peak output signal at the emitter of emitter-follower amplifier Q2 is still sufficiently high to overcome the threshold level established by zener diode CR3, the alarm relay will be allowed to drop out and an alarm condition signaled.

In addition to the above described circuit features, the new and improved measuring circuit also includes a malfunction indicating subcircuit whose construction is shown in FIG. 2 of the drawings. In FIG. 2, an input lead 22 that is connected to the number 6 output terminal of the first output, inverting feedback amplifier 81 shown in FIG. 1 supplies the output signal from feedback amplifier 81 through a gain adjusting resistor R3 to the number 3 input terminal of a non-inverting amplifier A3. The amplifier A3 likewise may comprise a conventional, commercially available, integrated circuit operational amplifier such as the Fairchild 7741. Amplifier 3 has its output coupled across a zener diode clipping circuit comprised by a pair of zener diodes CR4 and CR5 connected in series circuit relationship with a load resistor R27 across the output of the amplifier A3. The zener diodes CR4 and CR5 serve to clip the output from amplifier A3 to some predetermined voltage level (such as 5 volts) determined by the characteristics of the zener diodes. The clipped voltage pulses are supplied to a rectifying and filter circuit comprised by diode rectifier CR2 and filter capacitor C11 and resistor R30. The voltage appearing across filter capacitor C11 is applied to the base of a pair of darlington transistors Q6 connected as an emitter-follower. The emitter load resistor R32 of emitter-follower Q5 in turn is connected to the base of an NPN transistor Q7 having the solenoid winding of a relay actuated switch K3 connected in its collector circuit.

With the above arrangement, for so long as the filter capacitor C11 remains charged positively due to continued operation of the diode rectifier CR2, emitter follower Q6 will maintain transistor Q7 turned-on and the malfunction alarm indicating relay K3 will remain energized with its contacts closed. However, should the particle count measured by the condensation monitor 11–13 fall below the preset minimum reference level established by the clippingzener diodes CR4 and CR5, diode rectifier CR2 will block and allow filter capacitor C11 to discharge through resistor R30. This in turn allows the emitter load resistor R32 of emitter-follower Q6 to be driven sufficiently negative to turn off transistor Q7 thereby allowing the malfunction alarm relay K3 to drop out with its contacts assuming the normally open condition. This results in signalling a malfunction condition to the central station console. Such a malfunction condition would be signaled under circumstances where for example the sampling system becomes clogged or the humidifier of the condensation nuclei monitor has run out of water and as a result proper cloud formation around the normal background nuclei particles cannot occur. Similarly, a failure in the regulated power supply that energizes the lamp 11 and results in a more intense light beam could be signaled by the malfunction circuitry. Other similar malfunction conditions can occur which would result in the minimum output signal from the amplifier A1 dropping below the minimum reference level established by the zener diodes CR4 and CR5 which would be signalled to the central console so that the equipment could be checked.

From the foregoing description, it will be appreciated that the invention provides a new and improved self-adjusting condensation nuclei monitor measuring circuit having an adjustable gain feature for automatically conditioning the circuit for use under widely varying background conditions within relatively short sampling time periods. The circuit is intended primarily for use in connection with a single, common fire and/or dangerous gas sensor-detector of the condensation nuclei monitor type which sequentially is switched to sample and monitor the atmospheres of a number of different zones having widely different background characteristics. The condensation nuclei monitor employed preferably has improved self-adjusting features for maintaining its long term sensitivity despite dust accumulation, aging, temperature of other similar effects which might adversely affect satisfactory operation of the system.

Having described one embodiment of a new and improved condensation nuclei monitor measuring circuit having adjustable gain and constructed in accordance with the invention, it is believed obvious that other modifications and variations of the invention which are possible will be suggested to those skilled in the art in the light of the above teachings. It is therefore to be understood that changes may be made in the particular embodiment of the invention described which are within the full intended scope of the invention as defined by the appended claims.

What is claimed is:

1. A self-adjusting electro-optical detecting and amplifying circuit comprising an electro-optical detecting means for sensing short term changes in light level of a light beam impinging thereon as distinguished from longer term changes in operating characteristics due to temperature effects, dust accumulation in the optical path, ageing and the like, a source of electric energy, second electro-optic detecting means connected in circuit relationship with said first mentioned electro-optic detecting means and said source of electric energy for maintaining substantially constant long term electric energization conditions across the first electro-optic detecting means, inverting feedback amplifier means having the first electro-optic detecting means connected in a first fast time constant feedback path and responsive to both long and short term changes in operating conditions of said first electro-optic detecting means, a feedback light source for directing a beam of light onto the second electro-optic detecting means for controlling its electric resistivity, long time constant feedback circuit means coupling the output of said inverting feedback amplifier means to the feedback light source for controlling the intensity of the feedback light source to thereby maintain substantially constant long term electric energization conditions across said first electro-optic detecting means, and output indicating means responsive substantially only to the short term changes in the electric signal derived by the first electro-optic detecting means and coupled to the output from the inverting feedback amplifier means for deriving an output indication of the short term transient changes in light level sensed by the first electro-optic detecting means.

2. A self-adjusting electro-optical detecting and amplifying circuit according to claim 1 wherein said feedback light source and said second electro-optic detecting means comprise an integrally packaged single housing lamp-photo cell module.

3. A self-adjusting electro-optical detecting and amplifying circuit according to claim 1 further including sensing resistor means connected in series circuit relationship with said second electro-optic detecting means for monitoring the operating condition of the circuit and indicating the need for servicing, cleaning or replacement of the electro-optic detecting means.

4. A self-adjusting electro-optical detecting and amplifying circuit according to claim 1 further including second feedback amplifier means connected to the output from said first mentioned inverting feedback amplifier means, said second feedback amplifier means including a plurality of gain changing resistors selectively connectable in circuit relationship in the feedback path, and selectively operable switching means connected in circuit relationship with the gain changing resistors for automatically and sequentially connecting desired ones of the gain changing resistors into effective circuit relationship in the feedback path of the second feedback amplifier means whereby the gain of the second feedback amplifier means automatically is adjusted to correspond to the individual background conditions being monitored by the first electro-optic detecting means.

5. A self-adjusting electro-optical detecting and amplifying circuit according to claim 4 further including peak detecting circuit means connected to the output of the second feedback amplifier means, peak signal storing means responsive to the output of the peak detecting circuit means, level sensing and comparison circuit means coupled to said peak signal storing means for comparing the peak amplitude of the output signal to a predetermined maximum reference level and deriving an output alarm indication in the event that the peak amplitude of the output signal exceeds the maximum reference value established by the level sensing and comparison circuit means.

6. A self-adjusting electro-optical detecting and amplifying circuit according to claim 5 further including alarm indicating means coupled to and actuated by the level sensing and comparison circuit means and means for desensitizing the alarm indicator over a predetermined time interval synchronously with the switching of the gain changing resistors in the feedback path of the second feedback amplifier means.

7. A self-adjusting electro-optical detecting and amplifying circuit according to claim 6 wherein the alarm indicating means coupled to the output of the level sensing and comparison circuit means includes a charging capacitor, switching means responsive to the output from the level sensing and comparison circuit means for maintaining said charging capacitor in the first condition serving to maintain the alarm indicating means in its non-alarm condition, and said means for desensitizing the alarm indicating means comprises cam actuated switch means for clamping the charging capacitor to a source of electric potential whereby the charging capacitor is maintained at the preset non-alarm first condition during the short time duration sample switching operation synchronously with the switching in of the gain changing resistors in the feedback path of the second feedback amplifier means.

8. A self-adjusting electro-optical detecting and amplifying circuit according to claim 7 further including third output amplifier means connected to the output from said first mentioned inverting feedback amplifier means in parallel with the second feedback amplifier means, voltage level clipping means coupled to the output of the third output amplifier means for limiting the output voltage derived therefrom to a predetermined value, rectifying and filter circuit means coupled to the output from said voltage level clipping circuit means, and malfunction alarm indicating means coupled to the output from the rectifying and filter circuit means for indicating the existence of a malfunction condition upon the voltage derived from the rectifying and filter circuit means dropping below a predetermined minimum reference value.

9. A self-adjusting electro-optical detecting and amplifying circuit according to claim 8 wherein the first mentioned alarm indicating means and the malfunction alarm indicating means all comprise fail-safe relay actuated circuit means for signalling the existence of an alarm and/or malfunction condition in a fail-safe manner.

10. A self-adjusting electro-optical detecting and amplifying circuit according to claim 9 further including additional time controlled gain changing resistors selectively connectable in the feedback path of said second feedback amplifier means in accordance with a predetermined day and night schedule for further selectively adjusting the gain of said second feedback amplifier means in accordance with the time of day.

11. A self-adjusting electro-optical detecting and amplifying circuit according to claim 10 wherein the first electro-optic detecting means comprises the detecting element of a condensation nuclei monitor and feedback light source and second electro-optic detecting means comprise an integrally packaged single housing lamp-photo cell module, and further including sensing resistor means connected in series circuit relationship with the second electro-optic detecting means for monitoring the operating condition of the condensation nuclei monitor detecting and amplifying circuit in order to ascertain the need for servicing, cleaning or replacement of the electro-optic detecting elements.

12. A detecting and amplifying circuit for a multi-zone monitoring apparatus comprising a common highly sensitive sensor-detector located at a central control station for detecting and signalling the existence of an alarm condition in any one of the zones being monitored, the input to the common sensor-detector being automatically and sequentially switched from one zone to the next to selectively monitor conditions in the respective zones at a relatively rapid rate on the order of one every two or three minutes, output feedback amplifier means coupled to the output of the common-sensor detector for amplifying the output signals derived therefrom, a plurality of gain change resistors selectively connectable in the feedback path of the output feedback amplifier means to adjust the gain thereof to a number of different settings in accordance with which gain change resistors are selectively connected in the feedback path, and switching means operable synchronously with selective switching of the common sensor detector from one zone to the next for switching preselected ones of the gain changing resistors into effective circuit relationship in the feedback path of the output feedback amplifier whereby the sensitivity of the overall detecting and amplifying circuit is individually adjusted to background conditions existing in each of the zones being monitored synchronously with the switching of the common sensor detector from one zone to the next to monitor each of the respective zones.

13. A self-adjusting electro-optical detecting and amplifying circuit according to claim 12 further including peak detecting circuit means connected to the output of the output feedback amplifier means, peak signal storing means responsive to the ouptut from the peak detecting circuit means, level sensing and comparison circuit means coupled to said peak signal storing means for comparing the peak amplitude of the peak signal storing means to a predetermined maximum reference level and deriving an output alarm indication in the event that the peak amplitude of the output signal exceeds the maximum reference value established by the level sensing circuit means.

14. A self-adjusting electro-optical detecting and amplifying circuit according to claim 13 further including alarm indicating means coupled to and actuated by the level sensing and comparison circuit means and means for desensitizing the alarm indicator over a predetermined time interval synchronously with the switching of the gain changing resistors in the feedback path of the output feedback amplifier means.

15. A self-adjusting electro-optical detecting and amplifying circuit according to claim 14 wherein the alarm indicating means coupled to the output of the level sensing circuit means includes a charging capacitor, switching means responsive to the output from the level sensing circuit means for maintaining said charging capacitor in a first non-alarm condition in response to the output from the peak detecting circuit means remaining below the maximum reference level established by the level sensing circuit means, said charging capacitor in the first condition serving to maintain the alarm indicating means in its non-alarm condition, and said means for desensitizing the alarm indicating means comprises cam actuated switch means for clamping the charging capacitor to a source of electric potential whereby the charge on the charging capacitor is maintained at the preset non-alarm first condition during the short time duration sample switching operation synchronously with the switching in of the gain changing resistors in the feedback path of the second feedback amplifier means.

16. A self-adjusting electro-optical detecting and amplifying circuit according to claim 15 further including third output amplifier means connected to the output from said sensor-detector in parallel with the output feedback amplifier means, voltage level clipping means coupled to the output of the third output amplifier means for limiting the output voltage derived therefrom to a predetermined value, rectifying and filter circuit means coupled to the output from said voltage level clipping circuit means, and malfunction alarm indicating means coupled to the output from the rectifying and filter circuit means for indicating the existence of a malfunction condition upon the voltage derived from the rectifying and filter circuit means dropping below a predetermined minimum reference value.

17. A self-adjusting electro-optical detecting and amplifying circuit according to claim 16 wherein the first mentioned alarm indicating means and the malfunction alarm indicating means all comprise fail-safe relay actuated circuit means for signalling the existence of an alarm and/or malfunction condition in a fail-safe manner.

18. A self-adjusting electro-optical detecting and amplifying circuit according to claim 17 further including additional time controlled gain changing resistors selectively connectable in the feedback path of said output feedback amplifier means in accordance with a predetermined day and night schedule for further selectively adjusting the gain of said output feedback amplifier means in accordance with the time of day.

19. A self-adjusting electro-optical detecting and amplifying circuit according to claim 12 further including additional time controlled gain changing resistors selectively connectable in the feedback path of said output feedback amplifier means in accordance with a predetermined day and night schedule for further selectively adjusting the gain of said output feedback amplifier means in accordance with the time of day.

20. A self-adjusting electro-optical detecting and amplifying circuit according to claim 12 further including malfunction detecting circuit means coupled to the output from said sensor-detector in parallel with said first mentioned output feedback amplifier means for detecting and signalling the existence of a malfunction condition upon the output from the sensor-detector dropping below a preset minimum reference level.

* * * * *